United States Patent

Umetani et al.

[11] Patent Number: 4,502,928
[45] Date of Patent: Mar. 5, 1985

[54] METHOD AND APPARATUS FOR PRODUCING HALOGEN

[75] Inventors: Tetsumasa Umetani, Takatsuki; Katsutoshi Matsunaga, Nagareyama, both of Japan

[73] Assignee: Hitachi Zosen Corporation, Osaka, Japan

[21] Appl. No.: 559,602

[22] Filed: Dec. 8, 1983

[30] Foreign Application Priority Data

Dec. 8, 1982 [JP] Japan ............................. 57/215892

[51] Int. Cl.³ ............................................. C25B 1/34
[52] U.S. Cl. .................................... 204/98; 204/128; 204/228; 204/277; 204/278; 204/DIG. 4; 429/101
[58] Field of Search ............... 204/128, 228, 277, 278, 204/98, DIG. 4; 429/17, 19, 101

[56] References Cited

U.S. PATENT DOCUMENTS

| | | | |
|---|---|---|---|
| 3,484,617 | 12/1969 | Winsel | 204/DIG. 4 |
| 3,622,490 | 11/1971 | Lockett et al. | 204/228 |
| 4,080,271 | 3/1978 | Brown | 204/128 |
| 4,217,187 | 8/1980 | Tufts et al. | 204/128 |
| 4,310,396 | 1/1982 | Demairé et al. | 204/DIG. 4 |
| 4,343,868 | 8/1982 | Putt | 429/17 |
| 4,415,413 | 11/1983 | Veber | 429/17 |
| 4,459,187 | 7/1984 | Laganà et al. | 429/19 |

FOREIGN PATENT DOCUMENTS 642449  1/1962  Canada ............................. 204/DIG. 4

Primary Examiner—Winston A. Douglas
Assistant Examiner—Terryence Chapman
Attorney, Agent, or Firm—Armstrong, Nikaido, Marmelstein & Kubovcik

[57] ABSTRACT

A halogen production apparatus comprising a halogen production device and a metal-halogen secondary cell which contains in its electrolyte the same halogen as is produced by the production device. Drive power is supplied to the production device from a commercial power terminal. Charging power is supplied from the commercial power terminal to the secondary cell during a first period of time, for example, during a period of time in which the power cost is low. During this period of time, the halogen produced by the secondary cell is added to the halogen produced by the production device. During a second period of time different from the first period, for example, during a period of time in which the power cost is high, the power generated by the secondary cell is supplied to the production device while a portion of the halogen produced by the production device is being supplied to the electrolyte of the secondary cell.

10 Claims, 3 Drawing Figures

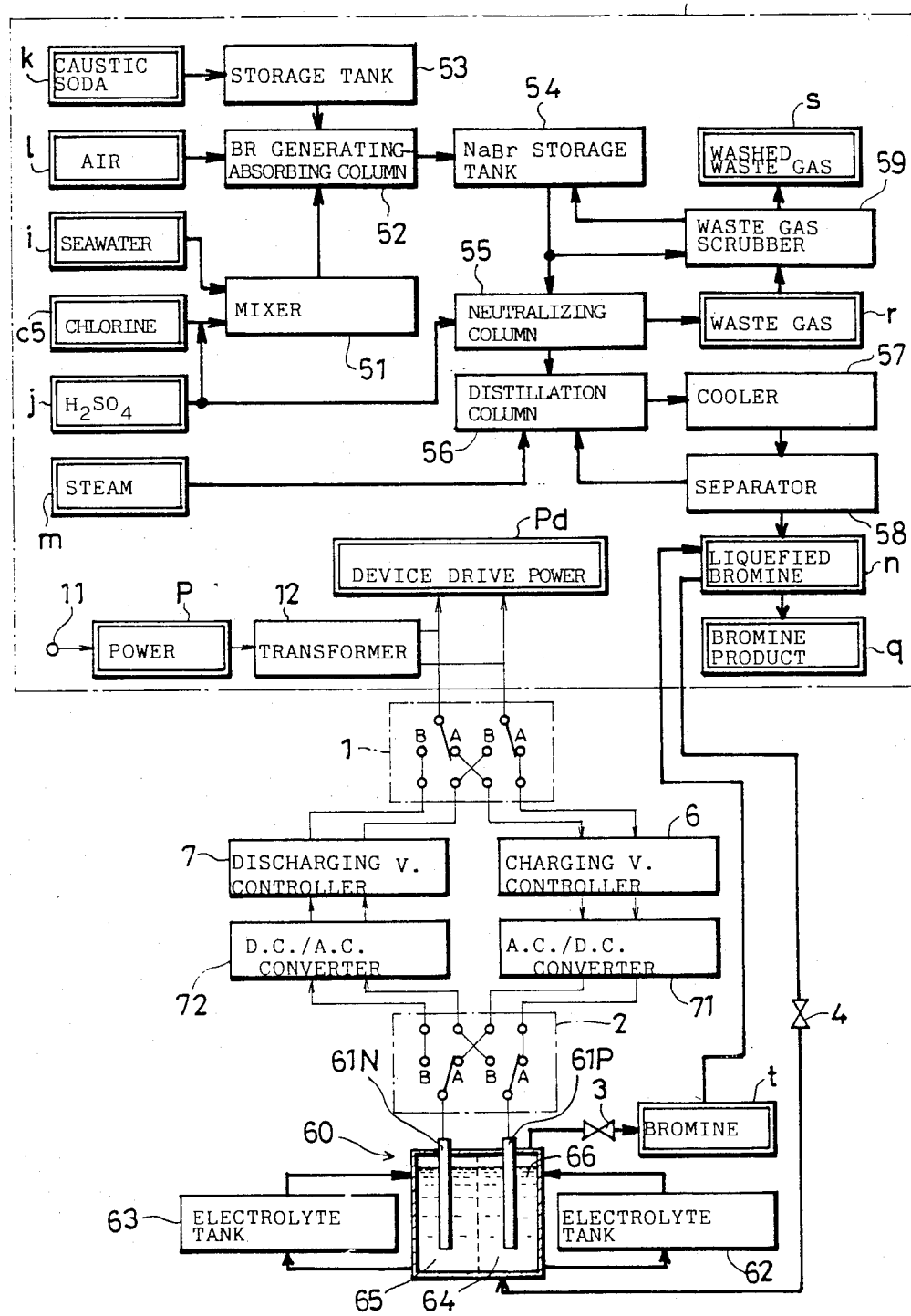

METHOD AND APPARATUS FOR PRODUCING HALOGEN

BACKGROUND OF THE INVENTION

1. Technical Field

The present invention relates to an apparatus for producing a halogen.

2. Description of the Prior Art

Apparatus for producing a halogen, such as chlorine, require a large amount of electric power, so that the reduction of power cost is an important problem. Because the unit power cost is lower in the nighttime than in the daytime in Japan, it is common to operate the apparatus at a higher rate in the nighttime than in the daytime in order to achieve savings in power. However, the lower daytime operation rate involves the problem that the halogen production apparatus is unable to fully exhibit its ability during the daytime.

It is generally thought that it is feasible to reduce the power cost by charging a cell with inexpensive power during night and to use the charge as a portion of the power for driving the device in the daytime.

SUMMARY OF THE INVENTION

An object of the present invention is to provide a halogen production apparatus incorporating a metal-halogen secondary cell to reduce the cost of the power to be purchased for a halgen production device and to increase the operation rate of the device in the daytime.

Another object of the invention is to achieve savings in equipment cost and energy cost by rendering the metal-halogen secondary cell chargeable and dischargeable without storing the halogen in the form of a hydrate. This eliminates the necessity of using a cooler for producing halogen hydrate, a storage for storing the hydrate and a heater for regenerating the halogen from the hydrate.

The halogen production apparatus of the present invention comprises a halogen production device and a metal-halogen secondary cell. The electrolyte of the metal-halogen secondary cell contains the same halogen as is produced by the halgen production device. Drive power is supplied to the halogen production device from a commercial power terminal. The halogen production apparatus further comprises a first power supply means for supplying power from the commercial power terminal to be charged in the metal-halogen secondary cell, a second power supply means for supplying the power generated by the cell to the halogen production device, and switch means for alternatively selecting between the first power supply means or the second power supply means.

When the power cost is low, for example, during the nighttime, the metal-halogen secondary cell is charged with power from the commercial power terminal via the first power supply means. When the power cost is high, for example, during the daytime, the power generated by the metal-halogen secondary cell is supplied to the halogen production device via the second power supply means to replenish the device with drive power. This makes the operation rate of the device higher than conventionally achieved during the daytime, making it possible to maintain a constant rate of operation day and night, at all times, and assuring a reduction in power cost.

With metal-halogen cells such as zinc-chlorine secondary cells, the chlorine generated during charging must be stored in the form of a chlorine hydrate, from which chlorine must be regenerated and supplied to the electrolyte during discharging. This requires a cooler for forming the halogen hydrate, a storage for the hydrate and a heater for regenerating the halogen from the hydrate. The halogen production apparatus of the present invention includes a means for supplying to the electrolyte of the metal-halogen secondary cell a portion of the halogen produced by the halogen production device, while the second power supply means is selected by the switch means. Therefore there is no need to store the halogen generated in the secondary cell during charging as a halogen hydrate. This eliminates the need for the cooler, storage and heater and achieves a reduction in the equipment cost and energy cost.

The halogen production apparatus of the present invention further includes means for adding the halogen generated in the secondary cell to the halogen produced by the halogen production device while the first power supply means is selected by the switch means. This assures effective use of the halogen generated by the secondary cell during charging.

Since the halogen generated in the secondary cell during charging is added to the halogen produced by the production device, the present apparatus produces a larger amount of halogen in the nighttime than in the daytime. Accordingly when the halogen is chlorine gas or the like which is liquefied by compression as a product, a larger amount of gas is liquefied in the nighttime when the power cost is low. This also achieves a reduction in the power cost.

Examples of halogen production devices are a device for producing chlorine, caustic soda and hydrogen by the electrolysis of common salt (electrolysis device for common salt), a device for producing caustic potash, chlorine and hydrogen by the electrolysis of potassium chloride, a device for producing chlorine and hydrogen by the electrolysis of hydrochloric acid (electrolysis device for hydrochloric acid), a device for electrolyzing a halide of alkaline earth metal for the production of the alkaline earth metal and the halogen, a device for producing aluminum and chlorine by the electrolysis of aluminum chloride, a device for producing copper and chlorine by the electrolysis of copper chloride, a device for producing bromine from seawater, etc.

The halogen to be used for the metal-halogen secondary cell is determined in corresponding relation to the halogen to be produced by the halogen production device. For example, when chlorine is to be obtained by the halogen production device, a metal-chlorine secondary cell is used, while a metal-bromine secondary cell is used when bromine is produced.

Examples of metals usable for the metal-halogen secondary cell are Zn, Fe, Co, Ni, Sc, Ti, V, Cr, Mn, Cu, Ga, Y, Zr, Nb, Mo, Tc, Ru, Rh, Pd, Ag, Cd, In, Sn, Hf, Ta, W, Re, Os, Ir, Pt, Au, Hg, Tl, Bi, elements of lanthanide series and elements of actinide series, among which Zn, Fe, Co and Ni are preferred. Usually Zn is used.

BRIEF DESCRIPTION OF THE DRAWINGS

FIG. 3 is a flow chart showing a bromine production apparatus for producing bromine from seawater.

DESCRIPTION OF THE PREFERRED EMBODIMENTS

Figure 1:
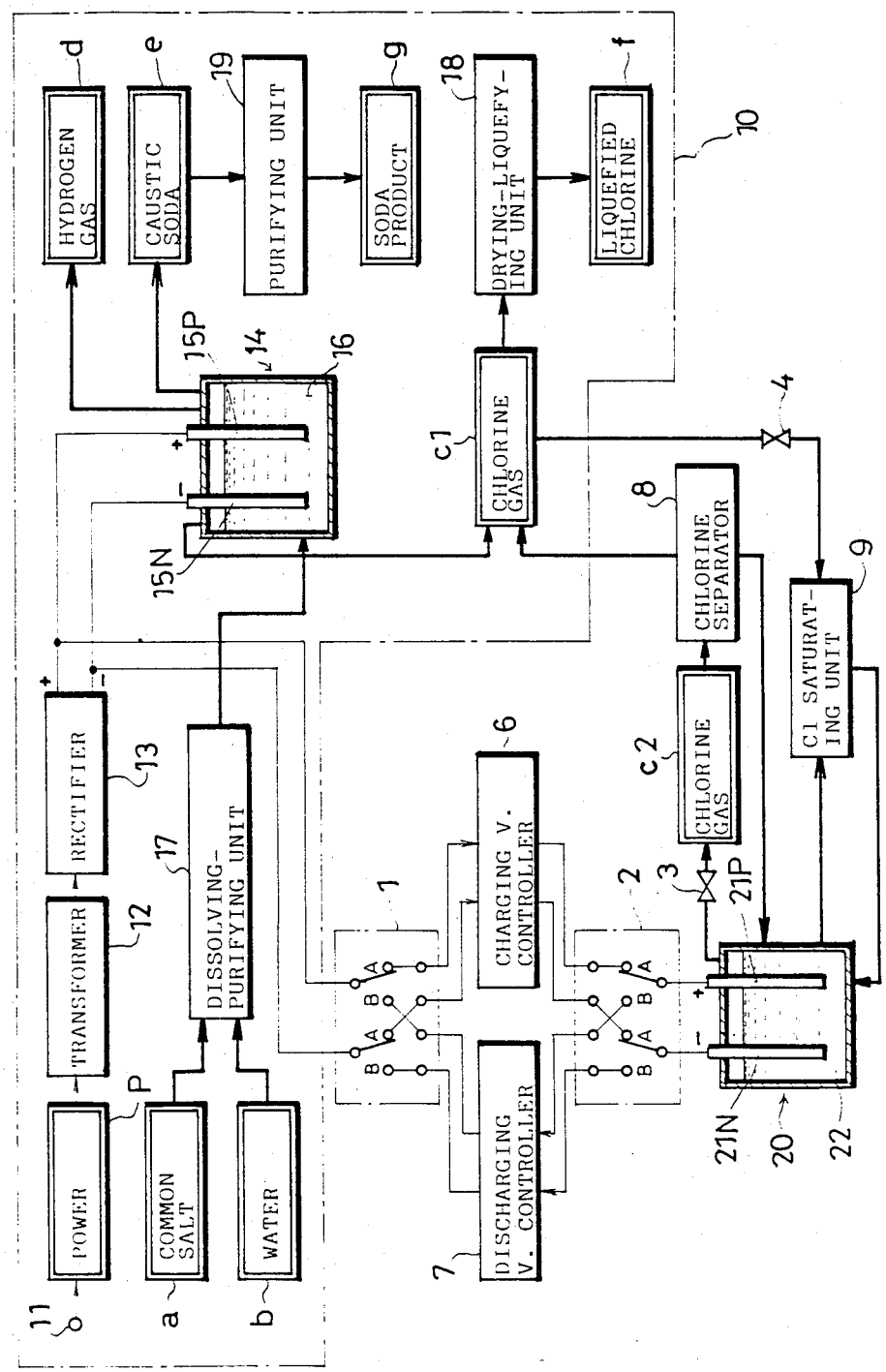
FIG. 1 is a flow chart showing a first chlorine production apparatus embodying the invention for producing chlorine from common salt.

FIG. 1 shows an embodiment of a first chlorine production apparatus for producing chlorine from common salt.

The first chlorine production apparatus comprises an electrolysis device 10 for common salt and a zinc-chlorine secondary cell 20. During the time when the power cost is low, for example, in the nighttime, first and second change-over switches 1 and 2 are closed for charging (at A side). A charging shutoff valve 3 is opened, and discharging shutoff valve 4 is closed. The a.c. power P from a commercial power terminal 11 is lowered to a required voltage by a transformer 12 and then converted to d.c. power by a rectifier 13. The d.c. power is applied to the anode 15P and the cathode 15N of an electrolytic cell of brine 14 and is partly sent to a charging voltage controller 6 via the first change-over switch 1. The d.c. power sent to the controller 6 is thereby adjusted to a voltage equal to the charging voltage for a secondary cell 20. Via the second change-over switch 2, the output power of the voltage controller 6 is applied to the positive electrode (zinc electrode) 21P and the negative electrode (chlorine electrode) 21N of the secondary cell 20.

Common salt (starting material) a and water b are supplied to a common salt dissolving-purifying unit 17 of the electrolysis device 10. In the unit 17, the common salt a is dissolved in the water b, and impurities are removed from the solution. The pure salt solution obtained is fed to the electrolytic cell 14 as an electrolyte 16 and is electrolyzed to produce chlorine gas c1, hydrogen gas d and caustic soda e. The chlorine gas c1 produced is sent to a chlorine drying-liquefying unit 18, in which the gas is liquefied to obtain liquefied chlorine f as a product. The caustic soda e is purified by a purifying unit 19 to obtain caustic soda g as a product.

In the zinc-chlorine secondary cell 20, zinc chloride contained in its electrolyte 22 is subjected to electrolysis with the d.c. power supplied from the voltage controller 6, producing zinc as deposited on the negative electrode 21N and chlorine gas c2 at the positive electrode side 21P and lowering the zinc chloride concentration of the electrolyte 22. Power in proportion to the amount of deposition of zinc is stored in the secondary cell 20. The chlorine gas c2 produced at the positive electrode side 21P is sent to a chlorine separator 8, in which the gas is separated from the electrolyte. The chlorine gas separated off is added to the chlorine gas c1 produced in the common salt electrolytic cell 14, and the combined gas is made into liquefied chlorine gas f by the drying-liquefying unit 18. The electrolyte separated from the chlorine gas in the separator 8 is returned to the secondary cell 20. In this way, the secondary cell 20 is charged with nighttime power, and the chlorine gas c2 generated in the cell 20 is used as a gas product.

During the time when the power cost is high, e.g., during daytime, the first and second change-over switches 1 and 2 are closed for discharging (at B side). Further the charging shutoff valve 3 is closed, while the discharging shutoff valve 4 is opened. When the discharging shutoff valve 4 is opened, the chlorine gas c1 produced in the electrolytic cell 14 is partly sent to a chlorine saturating unit 9, by which the chlorine is dissolved in the electrolyte 22 of the secondary cell 20.

When the chlorine is dissolved in the electrolyte 22, the chlorine dissolving in the electrolyte 22 becomes chlorine ion, and zinc deposited on the negative electrode 21N becomes zinc ion and dissolves in the electrolyte 22, increasing the zinc chloride concentration of the electrolyte 22 and generating d.c. power across the two electrodes 21P and 21N. The d.c. power is sent to a discharging voltage controller 7 through the second change-over switch 2 and adjusted to a voltage equal to the drive voltage for the brine electrolytic cell 14. Through the first switch 1, the output power of the controller 7 is applied to the electrodes 15P and 15N of the cell 14. During the daytime, the power generated by the secondary cell 20 is thus used as part of the drive power for the electrolytic cell 14. Accordingly the power consumption of the present apparatus can be smaller in the daytime than in the nighttime, while the electrolysis device 10 can be operated at a constant rate day and night.

Figure 2:
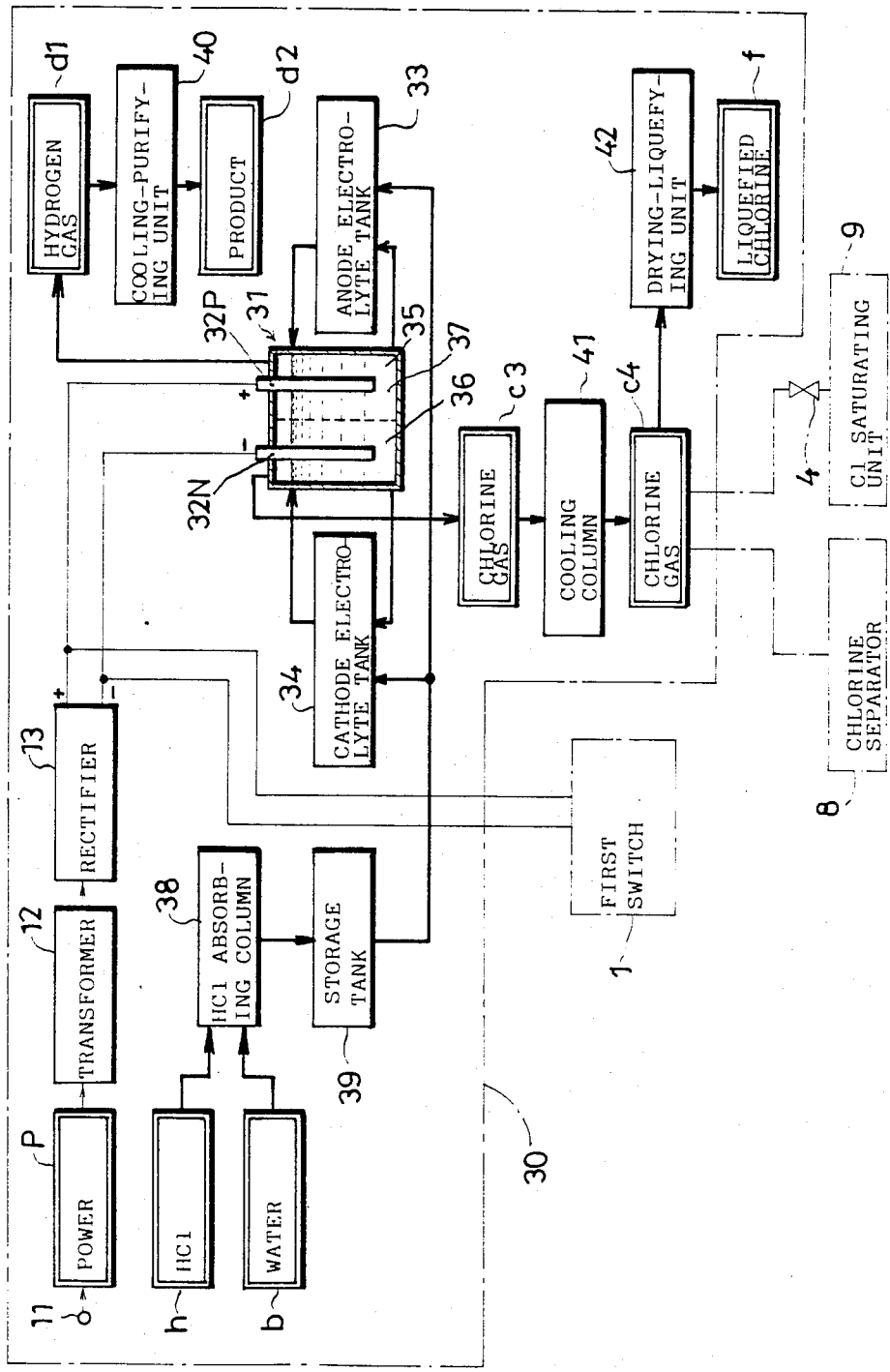
FIG. 2 is a flow chart showing a second chlorine production apparatus for producing chlorine from hydrochloric acid.

FIG. 2 shows an example of a second chlorine production apparatus for producing chlorine from hydrochloric acid.

The second chlorine production apparatus differs from the foregoing first apparatus only in that a hydrochloric acid electrolysis device 30 is used in place of the common salt electrolysis device 10 described.

The a.c. power P from a commercial power terminal 11 is lowered in voltage by a transformer 12 and then converted to d.c. power by a rectifier 13. The d.c. power is sent to the anode 32P and the cathode 32N of a hydrochloric acid electrolysis tank 31.

Hydrochloric acid (starting material) h and water b are sent to a hydrochloric acid absorption column 38, in which the hydrochloric acid h is absorbed by water b to form an aqueous solution of a concentration suitable for electrolysis. The aqueous hydrochloric acid solution is stored in a storage tank 39. The aqueous acid solution is supplied from the tank 39 to an anode electrolyte tank 33 and a cathode electrolyte tank 34 as an electrolyte 37. The electrolyte in the tank 33 and the electrolyte in the tank 34 are respectively supplied to the anode chamber 35 and cathode chamber 36 of a hydrochloric acid electrolysis tank 31 by pumps (not shown) in circulation. The aqueous acid solution 37 is electrolyzed to produce hydrogen gas d1 and chlorine gas c3. The hydrogen gas d1 is cooled and purified by a cooling-purifying unit 40 to a hydrogen gas product d2. The chlorine gas c3 is cooled by a cooling column 41 to a gas c4 and then liquefied by a drying-liquefying unit 42 to obtain liquefied chlorine f as a product.

Although not shown in FIG. 2, a zinc-chlorine secondary cell (indicated at 20 in FIG. 1) is charged with the d.c. power from the rectifier 13 in the nighttime as in the foregoing first chlorine production apparatus. The chlorine gas c2 generated in the secondary cell 20 during charging is added to the chlorine gas c4 cooled by the cooling column 41 of the device 30 and is used as a portion of the gas product f.

In the daytime, the chlorine gas c4 cooled in the cooling column 41 of the electrolysis device 30 is partly supplied to the electrolyte 22 of the cell 20, and the power generated by the cell 20 is supplied to the hydrochloric acid electrolysis tank 31 as a portion of drive power therefor.

FIG. 3 shows an example of a bromine production apparatus for producing bromine from seawater.

The bromine production apparatus comprises a bromine production device 50 and a zinc-bromine secondary cell 60. In the nighttime, first and second changeover switches 1 and 2 are closed for charging (at A side). A charging shutoff valve 3 is opened, and a discharging shut-off valve 4 is closed. The a.c. power P from a commercial power terminal 11 is lowered in voltage to a required value by a transformer 12. The a.c. power of reduced voltage is used as drive power Pd for the device 50 and is partly sent to a charging voltage controller 6 via the first switch 1. The a.c. power sent to the controller 6 is thereby adjusted in voltage and then fed to an a.c./d.c. converter 71, in which it is converted to d.c. power. The d.c. power is supplied from the converter 71 to the positive electrode 61P and negative electrode 61N of the cell 60.

In the bromine production device 50, seawater i serving as a starting material is sent to a mixer 51 along with chlorine c5 and sulfuric acid j to mix the seawater i with the chlorine c5 and sulfuric acid j. The mixture is sent to a bromine generating-absorbing column 52. Caustic soda k is stored in the form of an aqueous solution in a storage tank 53. The aqueous solution of caustic soda is also fed to the absorbing portion of the column 52. Air l is supplied to the column 52 by a blower (not shown). In the bromine generating column 52, bromine is isolated from the mixture forwarded from the mixer 51. The bromine is sent into the absorbing portion as entrained in the air l supplied to the absorbing column 52 and is absorbed by the aqueous solution of caustic soda fed to the absorbing portion to form sodium bromide, which is then stored in a storage tank 54. The sodium bromide in the tank 54 is sent to a neutralizing column 55 along with the sulfuric acid j for neutralization. The aqueous solution containing the bromine formed by the neutralization is sent to a distillation column 56 along with steam m and distilled, whereby gaseous bromine is formed. The gaseous bromine is passed through a cooler 57 and a separator 58 and converted to liquefied bromine n, whereby product bromine q is obtained. The neutralizing column 55 releases a water gas r, which is sent to a waste gas scrubber 59. The aqueous solution of sodium bromide is supplied from the sodium bromide storage tank 54 to the scrubber 59, in which the waste gas r is washed with the aqueous solution. The washed waste gas s is released to the atmosphere.

An electrolyte containing zinc bromide is supplied in circulation from a positive electrode tank 62 and a negative electrode tank 63 respectively to the positive electrode chamber 64 and negative electrode chamber 65 of the zinc-bromine secondary cell 60 by pumps (not shown). The zinc bromide in the electrolyte 66 is electrolyzed with the d.c. power supply to electrodes 61P and 61N, whereby zinc is deposited on the negative electrode 61N, and bromine t is generated at the positive electrode side 61P. Thus, the secondary cell 60 is charged. The bromine t generated at the positive electrode side 61P is added to the liquefied bromine n produced by the device 50 and is used as part of the bromine product.

In the daytime, the first and second switches 1 and 2 are closed for discharging (at B side). The charging shutoff valve 3 is closed, while the discharging shutoff valve 4 is opened. When the discharging valve 4 is opened, the liquefied bromine n produced by the device 50 is partly sent to the positive electrode chamber 64 of the cell 60 and dissolved in the electrolyte 66, whereupon the zinc deposited on the negative electrode 61N becomes zinc ion and dissolves in the electrolyte 66, while the bromine dissolving in the electrolyte 66 becomes bromine ion, consequently increasing the zinc bromide concentration of the electrolyte 66 and generating d.c. power across the electrodes 61P and 61N of the secondary cell 60. The d.c. power is supplied through the second switch 2 to a d.c./a.c. converter 72 and thereby converted to a.c. power, which is adjusted in voltage by a discharging voltage controller 7. The power is thereafter sent to the bromine production device 50 via the first change-over switch 1 and is used as part of the power Pd for driving the device 50.

What is claimed is:

1. A method for effectively utilizing electric power for a halogen production device comprising:
  providing a metal-halogen secondary cell and a power supply means for supplying power to the halogen production device, the metal-halogen secondary cell containing in its electrolyte the same halogen as the halogen to be produced by the production device,
  charging the secondary cell during a first period of time, with power from a commercial power terminal, while adding the halogen produced by the secondary cell to the halogen produced by the production device, and
  supplying a portion of the halogen produced by the production device to the electrolyte of the secondary cell during a second period of time different from the first period of time while supplying the power generated by the secondary cell through the power supply means to the production device.

2. A method as defined in claim 1 wherein the first period of time is a period of time during which the power cost is low, and the second period of time is a period of time during which the power cost is high.

3. A method as defined in claim 1 wherein the halogen production device is a device for producing chlorine by the electrolysis of an aqueous solution of common salt, and the secondary cell is a zinc-chlorine secondary cell containing zinc chloride in its electrolyte.

4. A method as defined in claim 1 wherein the halogen production device is a device for producing chlorine by the electrolysis of hydrochloric acid, and the secondary cell is a zinc-chlorine secondary cell containing zinc chloride in its electrolyte.

5. A method as defined in claim 1 wherein the halogen production device is a device for producing bromine from seawater, and the secondary cell is a zinc-bromine secondary cell containing zinc bromide in its electrolyte.

6. An apparatus for producing a halogen comprising a commercial power terminal, a halogen production device for receiving a supply of drive power from the commercial power terminal, a metal-halogen secondary cell containing in its electrolyte the same halogen as the halogen to be produced by the production device, first power supply means for supplying charging power from the commercial power terminal to the metal-halogen secondary cell, second power supply means for supplying the power generated by the metal-halogen secondary cell to the production device, switch means for alternatively selecting between the first power supply means and the second power supply means, means for adding the halogen produced by the metal-halogen secondary cell to the halogen produced by the production device when the first power supply means is selected by the switch means, and means for supplying a portion of the halogen produced by the production device to the electrolyte of the metal-halogen secondary cell when the second power supply means is selected by the switch means.

7. An apparatus as defined in claim 6 wherein the switch means selects the first power supply means during a period of time in which the power cost is low and selects the second power supply means during a period of time in which the power cost is high.

8. An apparatus as defined in claim 6 wherein the halogen production device is a device for producing chlorine by the electrolysis of an aqueous solution of common salt, and the metal-halogen secondary cell is a zinc-chlorine secondary cell containing zinc chloride in its electrolyte.

9. An apparatus as defined in claim 6 wherein the halogen production device is a device for producing chlorine by the electrolysis of hydrochloric acid, and the metal-halogen secondary cell is a zinc-chlorine secondary cell containing zinc chloride in its electrolyte.

10. An apparatus as defined in claim 6 wherein the halogen production device is a device for producing bromine from seawater, and the metal-halogen secondary cell is a zinc-bromine secondary cell containing zinc bromide in its electrolyte.

* * * * *